(12) United States Patent
Tanaka et al.

(10) Patent No.: US 7,218,732 B2
(45) Date of Patent: May 15, 2007

(54) FOLDING PORTABLE TERMINAL

(75) Inventors: Satoshi Tanaka, Hitachinaka (JP);
Yuuichi Oota, Hitachiota (JP); Kazuo Shimoyamada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 10/617,690

(22) Filed: Jul. 14, 2003

(65) Prior Publication Data

US 2004/0075620 A1  Apr. 22, 2004

(30) Foreign Application Priority Data

Sep. 30, 2002  (JP) ............... 2002-284733

(51) Int. Cl.
*H04M 1/00* (2006.01)
(52) U.S. Cl. ............... 379/433.13; 455/575.3
(58) Field of Classification Search ........... 379/433.13; 455/575.3, 575.1; 348/340
See application file for complete search history.

(56) References Cited

U.S. PATENT DOCUMENTS 5,491,507 A    2/1996 Umezawa

| 6,879,337 B2* | 4/2005 | Tatehana et al. ........ 379/433.13 |
| 2003/0040288 A1* | 2/2003 | Kang et al. .............. 455/575.1 |
| 2003/0155216 A1* | 8/2003 | Park et al. |
| 2004/0095500 A1* | 5/2004 | Sato et al. ................. 348/340 |
| 2004/0162036 A1* | 8/2004 | Park |

FOREIGN PATENT DOCUMENTS

| CN | 2302541 Y | 12/1998 |
| JP | 05-023300 | 2/1993 |
| JP | A-10-65780 | 3/1998 |
| JP | A-11-69214 | 3/1999 |
| JP | 2000-253124 | 9/2000 |
| JP | A-2001-320463 | 11/2001 |

* cited by examiner

*Primary Examiner*—William J. Deane, Jr.
(74) *Attorney, Agent, or Firm*—Antonelli, Terry, Stout and Kraus, LLP.

(57) ABSTRACT

In a folding portable terminal equipped with the imaging camera, in order to prevent deformation-induced damage to an imaging camera when the folding portable terminal is dropped and gets a strong shock, each face of a camera module housed in an imaging camera casing is retained in place in the camera casing by cushioning members made of a material having excellent shock absorbency, thereby preventing deformation-induced damage to the camera module.

10 Claims, 6 Drawing Sheets

FOLDING PORTABLE TERMINAL

BACKGROUND OF THE INVENTION

1. Field of the Invention

The present invention relates to a portable terminal with imaging capabilities, and particularly to a folding portable terminal with an imaging camera, the folding portable terminal being formed by turnably coupling two casings so as to be opened and closed.

2. Description of Related Art

There are various kinds of conventional portable terminals such as PDAs (Personal Digital Assistants) and cellular phones. Among all the kinds of portable terminals, the cellular phone is most widely used in society. One type of cellular phone is the folding type that joins a display section casing and an operation section casing foldably via hinge joints so that both casings mate with each other. Since such a folding type can make its overall dimensions compact and its display screen relatively big, it widely gains currency in the market. There is also another conventional type of cellular phone with an imaging camera. With this type of cellular phone, still or motion picture transmitting and receiving services have been offered. One example of this type is disclosed in JP-A-2001-320463. This publication teaches that an imaging camera is equipped on the rear of the casing so that the user can pick up with the camera an image of an external object (others) while monitoring it on an LCD (Liquid Crystal Display). Since this configuration places importance on photographing others, it is awkward to photograph the user himself or herself (the self) because the monitor screen cannot be seen by the user.

Another type of folding cellular phone with an imaging camera is disclosed in JP-A-10-65780 and JP-A-11-69214. In this type of folding cellular phone, the imaging camera is mounted rotatably via hinge joints, so that the user can point the imaging camera at both the self and the external object through one-touch operation in such a state that the LCD side casing remains open, thereby photographing the target image while monitoring it on the LCD. This configuration allows for use of video telephone functions realized in such a manner that the user points the imaging camera at himself or herself during a telephone conversation to take and transmit a video picture of himself or herself while displaying a video picture of the conversation partner on the LCD.

Although various types of imaging camera-equipped portable terminals having such a configuration are now in practical use, the camera unit of the imaging camera equipped in each type of portable terminal is just soldered on a circuit board without special consideration for durability against dropping impact.

In the technique described in JP-A-11-69214, a hinge joint or connection portion between two casings is provided only on one side, and this hinge mechanism lowers its torsional rigidity and flexural rigidity important to support the two casings. Further, the cantilevered state of the image camera portion is also vulnerable to deformation-induced damage due to impact from dropping or the like.

The technique described in JP-A-10-65780 is stronger in structure than the technique described in JP-A-11-69214 because two hinge joints are provided at both ends. In this technique, however, since the casing that houses the imaging camera is larger than the outside diameter of the hinge joints, the camera casing first bumps against obstacles in case of dropping the cellular phone. This causes that inertial forces, imposed not only on the camera and the camera casing, but also on the other parts of the cellular phone, are exerted on the camera casing and the hinge joints, thereby running the danger of damaging the camera casing and the hinge joints.

SUMMARY OF THE INVENTION

It is an object of the present invention to provide a folding portable terminal with a sturdy, easy-to-handle imaging camera having a high degree of flexibility as an imaging camera.

In order to attain the above object, the first problem that the present invention addresses is to decrease the acceleration of a camera module in the imaging camera casing due to the impact of the dropping of the portable terminal in use.

The second problem that the present invention addresses is to reduce a force exerted on the camera casing and increase the impact resistance of the camera casing.

To solve the first problem, a folding cellular phone according to the invention is such that a camera module is mounted by arranging cushioning members between the inner surface of a casing and the camera module, thereby loosening the impact on the camera due to dropping or the like.

On the other hand, the second problem can be solved by a portable terminal according to the invention, which is such that a first casing and a second casing are coupled via two hinge joints, with an imaging camera arranged between the two hinge joints. In such a construction, the outside diameter of the imaging camera casing is set smaller than the outside diameter of the hinge joints to prevent inertial forces imposed on the other parts of the portable terminal from being exerted on the camera casing in case of dropping the portable terminal, thereby preventing any damage to the imaging camera and the camera casing.

Other objects, features and advantages of the invention will become apparent from the following description of the embodiments of the invention taken in conjunction with the accompanying drawings.

DESCRIPTION OF THE PREFERRED EMBODIMENT

An embodiment of the present invention will be described below with reference to FIGS. 1A through 6.

Figure 1A:
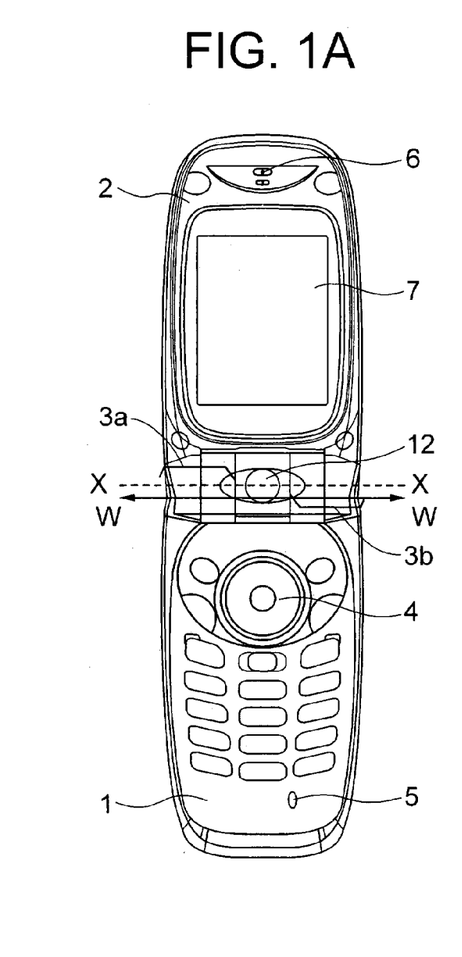
FIGS. 1A, 1B, and 1C are outline views showing a folding portable terminal according to an embodiment of the invention.
Figure 1B:
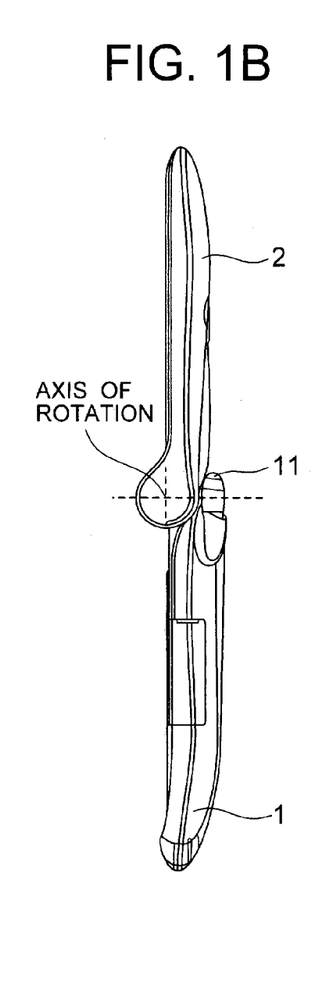
Figure 1C:
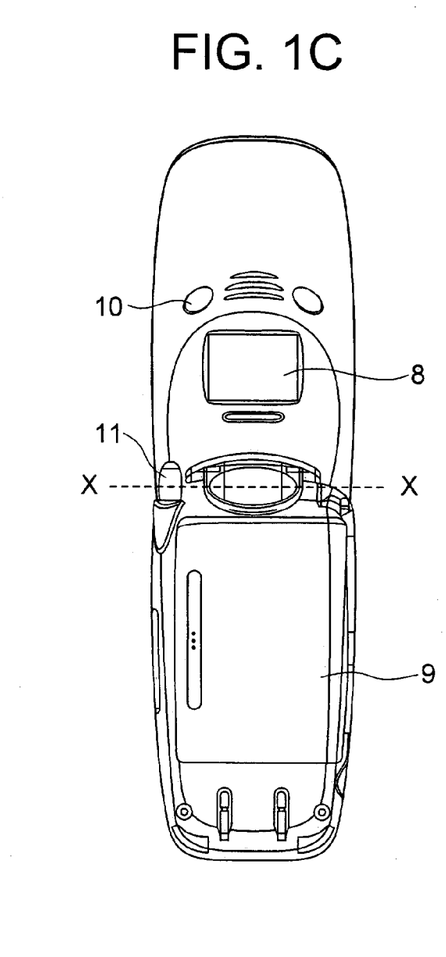

FIGS. 1A to 1C show an open state of a folding cellular phone with an imaging camera according to an embodiment of the invention. FIG. 1A is a front view, FIG. 1B is a side view, and FIG. 1C is a rear view. A first casing 1 mainly includes operation keys (all keys provided on the first casing) 4, a microphone 5, a built-in battery hidden from view, a battery storage cover 9, an antenna 11, and a circuit board for control of transmitting and receiving operations and the entire operation of the cellular phone. A second casing 2 mainly includes a headphone 6, a main display 7, a subdisplay 8, and two rear buttons 10. One ends of the first and second casings 1 and 2 are adjacent to each other across the width (W—W direction) with parts extending toward each other. The parts house built-in hinges (a left hinge portion 34a and a right hinge portion 34b in FIG. 6) serving as a rotating shaft of the folding cellular phone. The first casing 1 and the second casing 2 are coupled via the hinges at a left hinge joint 3a and a right hinge joint 3b so that they can rotate about a rotation axis of the hinges (indicated with X—X in FIG. 1) within the range of 0 to about 180 degrees with respect to each other.

Figure 5A:
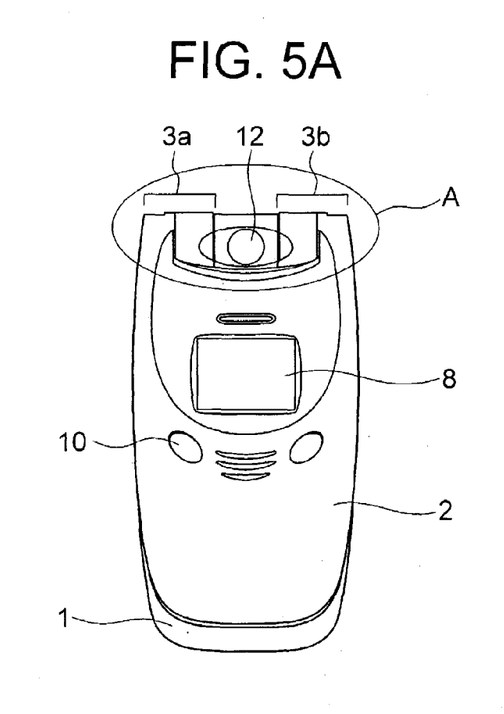
FIGS. 5A and 5B are front and top views showing the imaging camera unit of the folding portable terminal according to the embodiment of the invention.
Figure 5B:
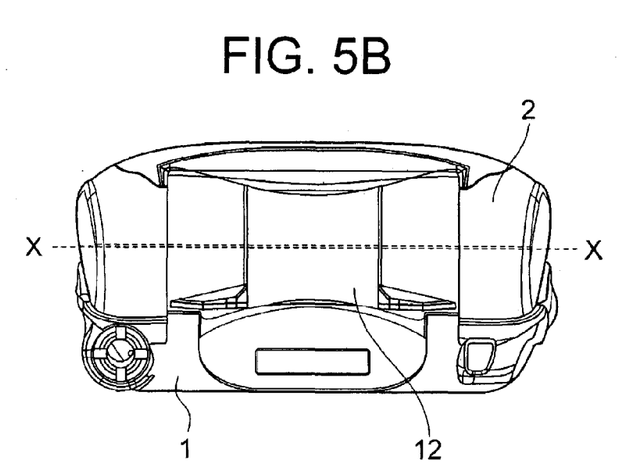
Figure 5C:
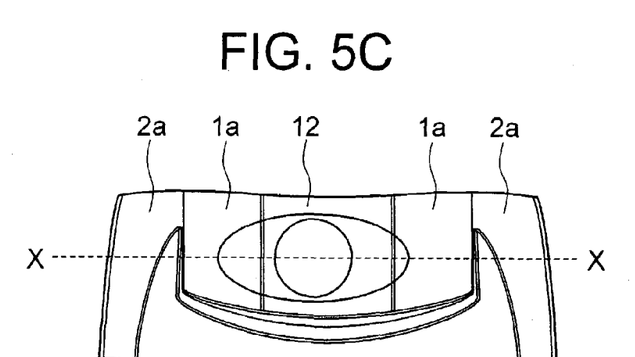
FIG. 5C is an enlarged view of (A) part in FIG. 5A.

FIG. 5A is a front view of the cellular phone, which is in such a state that it is closed by rotating the first and second casings 1 and 2 about the axis of rotation X—X. As shown in FIGS. 5A to 5C, hinge joints 1a of the first casing 1 and hinge joints 2a of the second casing 2 extend, toward each other, inward and outward respectively across the width of the left hinge joint 3a and the right hinge joint 3b. An imaging camera 12 is provided between the hinge joints 1a of the first casing 1 so that it can rotate about the axis of rotation X—X.

Figure 2A:
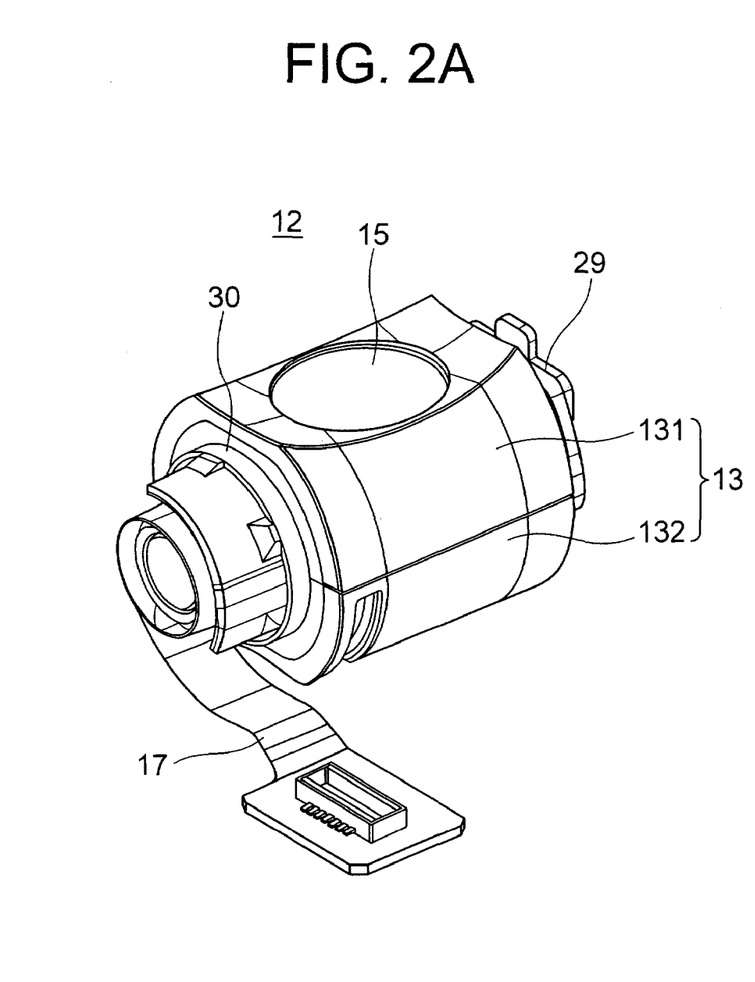
FIGS. 2A and 2B are perspective and sectional views showing an imaging camera unit according to the embodiment of the invention.
Figure 2B:
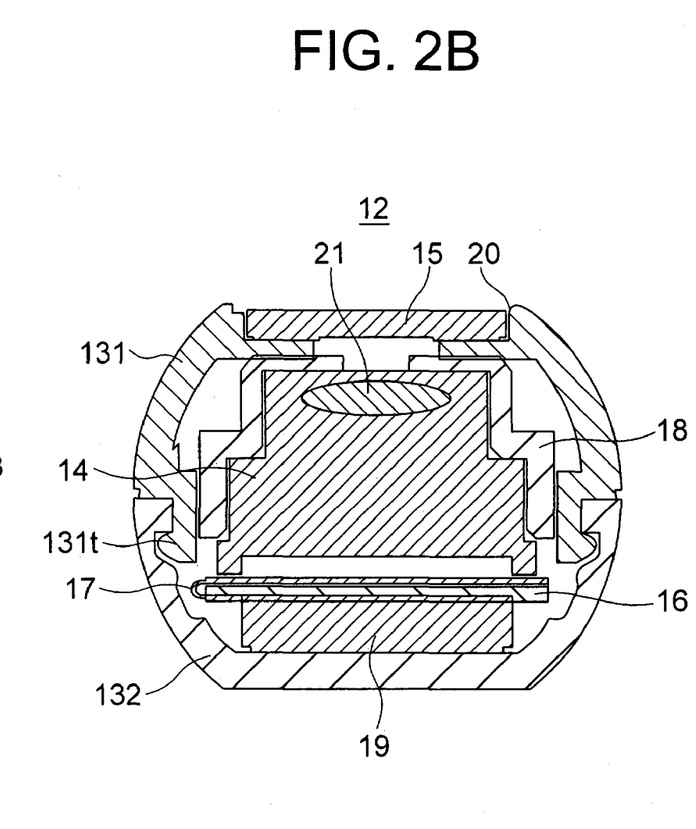

Referring next to FIGS. 2A and 2B, the construction of the imaging camera 12 will be described.

FIG. 2A is a perspective view showing the appearance of the imaging camera 12. FIG. 2B is a sectional view of a central plane of the imaging camera 12 defined as orthogonal to the axis of rotation X—X in FIG. 1A. Shown in FIGS. 2A and 2B are a camera casing 13 consisting of an upper casing 131 and a lower casing 132, a camera module 14, a protection plate 15, a camera module board 16, a flexible board 17, a first cushioning member 18, a second cushioning member 19, an imaging camera aperture 20 provided in the camera casing 13, and an optical lens 21 included in the camera module 14.

Figure 3:
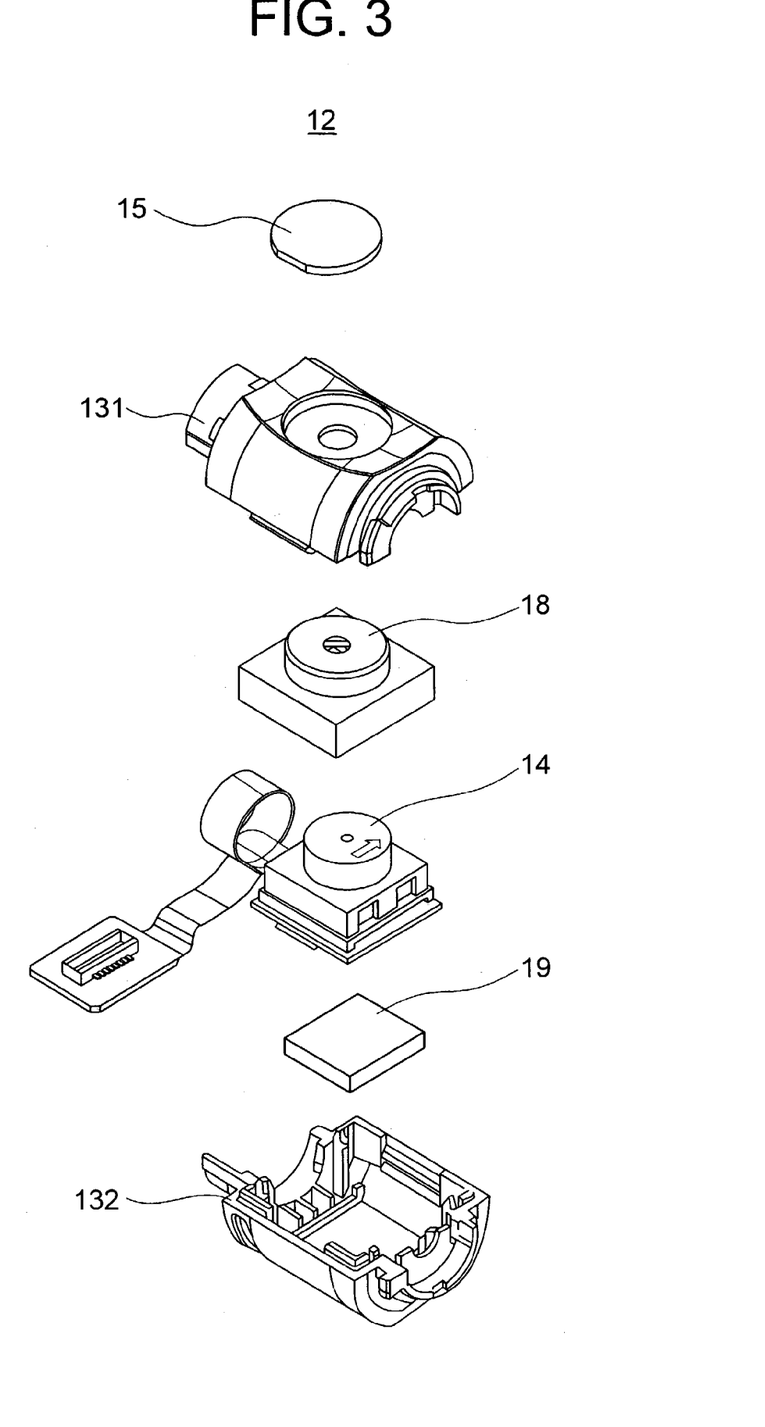
FIG. 3 is an exploded view of the imaging camera unit according to the embodiment of the invention.
Figure 4:
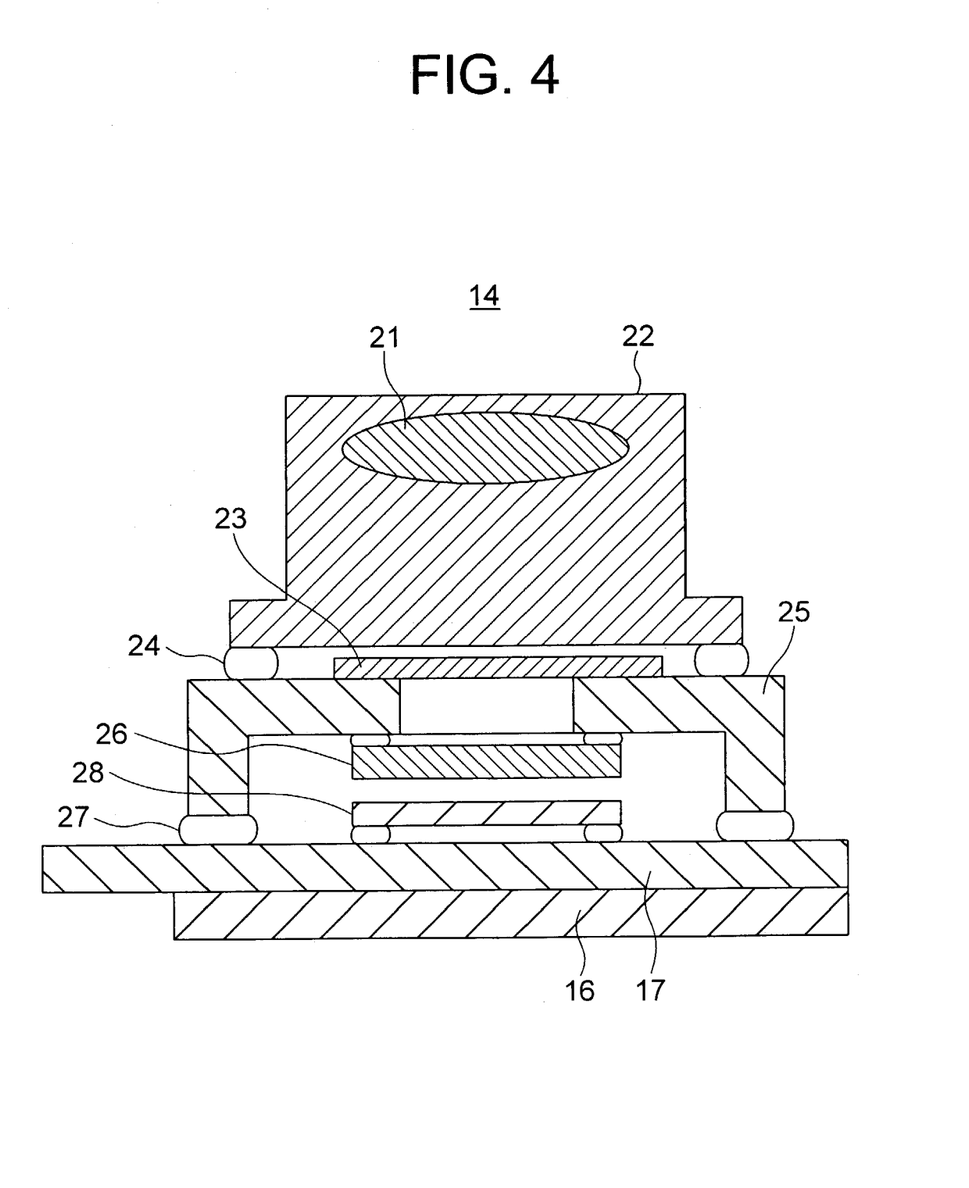
FIG. 4 is a sectional view showing the construction of a camera module in the imaging camera unit according to the embodiment of the invention.

FIG. 3 is an exploded view of the imaging camera 12, and FIG. 4 is a schematic sectional view of the camera module 14.

As shown in FIGS. 2B, 3, the imaging camera 12 is such that the camera casing 13 having the imaging camera aperture 20 houses some members, such as the camera module board 16 on which the camera module 14 is soldered, and the flexible board 17. The protection plate 15 for protecting these members is attached to the camera aperture 20. As shown in FIG. 4, the camera module 14 is such that a lens barrel 22 with the optical lens 21 sealed in it is fixed with a lens-barrel fixing adhesive 24 on a ceramic board 25 with an infrared shielding plate 23 placed on it, and the ceramic board 25 is fixed with solder 27 on the flexible board 17. The camera module board 17 is strongly bonded to the flexible board 17 in a stage of part assembly.

Also, as shown in FIG. 4, an image pickup device 26 is soldered on the rear face of the ceramic board 25, and an image processing circuit 28 is soldered on the flexible board 17. The image pickup device 26 and the image processing circuit 28 are arranged along the optical axis of the optical lens 21 to face each other. Adhesive is further filled in the camera module. To be more specific, it is filled in a space surrounding the infrared shielding plate 23 of the camera module 14 between the undersurface of the lens barrel 22 and the upper surface of the ceramic board 25, and a space surrounding the image pickup device 26 and the image processing circuit 28 between the inner surface of the ceramic board 25 and the upper surface of the flexible board 17. The application of the adhesive makes it possible to improve the mechanical strength of the camera module 14. In this case, the filling adhesive should be of a low-rigidity material to prevent any deformation due to thermal expansion.

Further, as shown in FIGS. 2B and 3, each side of the camera module 14 is surrounded by the first cushioning member 18 and the second cushioning member 19 each made of a material having excellent shock absorbency such as rubber so that the camera module 14 is retained in the camera casing 13 by the cushioning members 18 and 19. The cushioning material 18 is arranged between the upper side and upper surface of the camera module 14 and the inner surface of the upper casing 131 of the camera casing 13 so that at least some portions will be compressed between the camera module 14 and the camera casing 13. The portions compressed between them are substantially symmetrical to both of two planes including the optical axis of the optical lens 21 and orthogonal to each other, thereby preventing any rattle.

On the other hand, the cushioning member 19 is arranged between the board 16 and the lower casing 132 of the camera casing 13 so that at least a portion of the cushioning member 19 will be compressed between the board 16 and the camera casing 13 to prevent any rattle in the direction of the optical axis of the optical lens 21. Further, the buffering member 18 allows for certain clearances from claws 131t of the upper casing 131 because the claws 131t are deformed inward when the upper casing 131 and the lower casing 132 are joined together.

The above-mentioned construction can not only prevent any deformation-induced damage to the camera module 14 even when the portable terminal is dropped and gets a strong shock, but also hold the camera module 14 steadily in place in the camera casing 13. Further, the first cushioning member 18 is continuously appressed against the inner surface of the camera casing 13 and the outer periphery of the camera module 14 respectively, thereby preventing the intrusion of dirt such as grime and dust into the camera module 14.

The cushioning members 18 and 19 are preferably of a material having low creep, high flexibility, and capable of making a shape with effective shock absorbency. In the embodiment, low-resilience silicon rubber is used. The combined amount of compression of the cushioning members 18 and 19 was taken as about 0.1 to 0.2 mm so as to obtain desirable results. In the embodiment, although the cushioning members 18 and 19 are arranged over and below the dividing plane to the camera casing 13 to apply a vertically pressurized force to the camera module 14, the arrangement of the cushioning members are not limited to the over-and-below arrangement, and any other arrangement may be adopted as long as it can improve workability and make the camera module maintain a steady position and posture.

Figure 6:
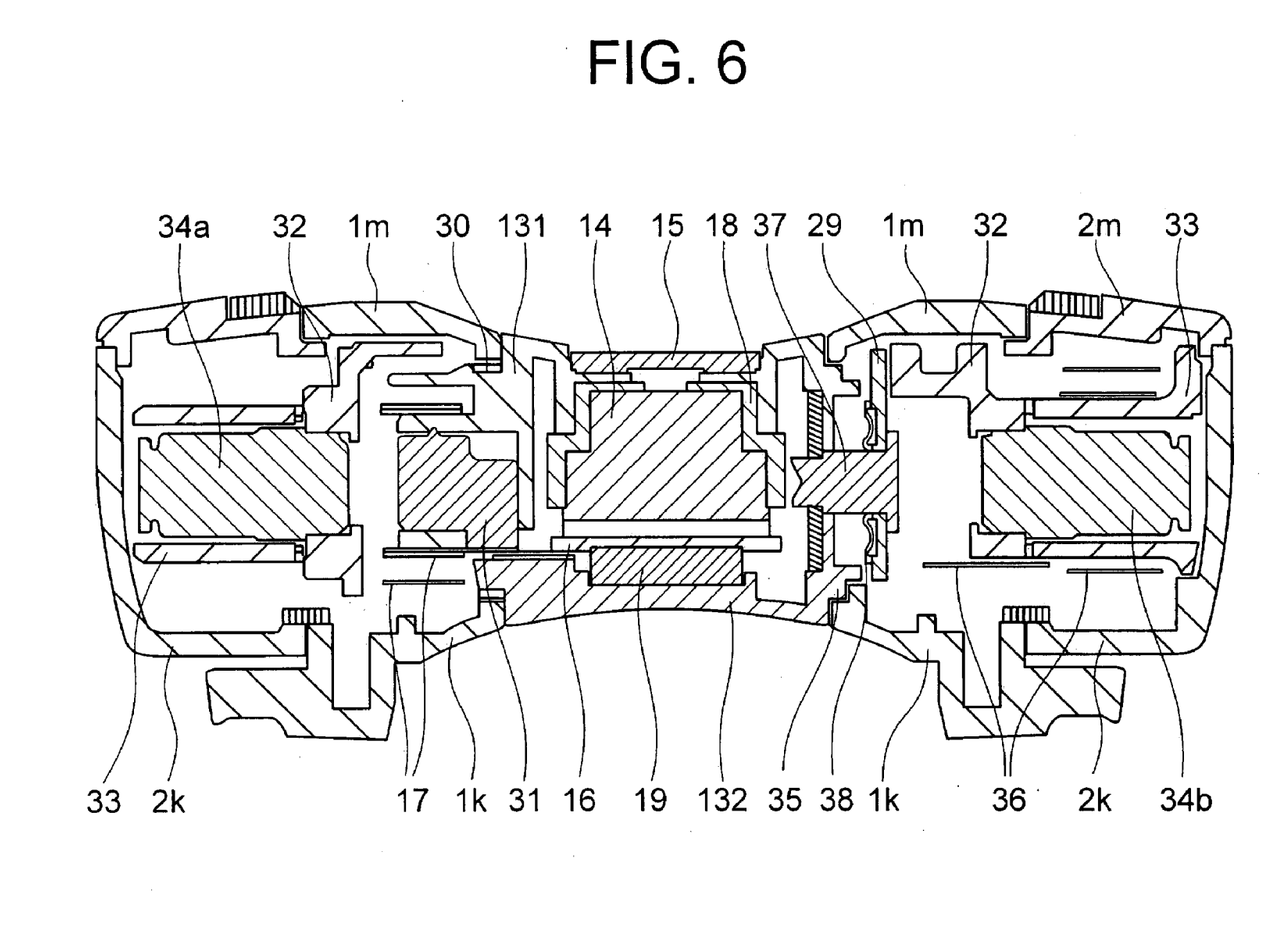
FIG. 6 is a sectional view showing an arrangement around an axis of rotation, X—X, of the folding portable terminal according to the embodiment of the invention.

FIGS. 5A to 5C show the cellular phone, which is in such a state that the first and second casings 1 and 2 are folded to turn the display 8 to the outside. FIG. 5A is the front view of the cellular phone, FIG. 5B is the top view, and FIG. 5C is a detailed outline view of the hinge joint portions as seen from the front. Further, FIG. 6 is a sectional view of the hinge joint portions, as seen from the top, taken along the axis of rotation X—X. It should be noted that the camera faces the front in FIG. 5C and the rear in FIG. 6. As shown in FIGS. 5C and 6, the outside diameter of the camera casing 13 is smaller than that of the rotating parts of the left hinge joint portion 3*a* and the right hinge joint portion 3*b*, thereby preventing the camera casing from directly bumping against obstacles in case of dropping the portable terminal.

Since the impact applied to the camera unit 12 when the portable terminal is dropped comes though the first casing 1 or the second casing 2, the acceleration of the impact is decayed along the way to considerably lower the impact, as compared with a direct impact applied to the camera casing 13. Further, since the camera module 14 is held in place through the cushioning members 18 and 19 as mentioned above, the acceleration of the impact applied to the camera module 14 is further reduced, thereby preventing any deformation-induced damage to the camera module 14.

Referring next to FIG. 6, an arrangement around the axis of rotation X—X will be described. The first casing 1 is assembled by joining and screwing a first casing front panel 1*m* and a first casing rear panel 1*k* together. On the other hand, the second casing is assembled by joining and screwing a second casing front panel 2*m* and a second casing rear panel 2*k* together. The first casing 1 and the second casing 2 house the first metallic frame 32 and the second frame 33, respectively, in such a manner not to cause displacement between them. One ends of the first and second frames have the common axis of rotation X—X, and the hinges 34*a* and 34*b* are inserted in both sides of the first and second frames to join the both sides of the first and second frames together. The inner sides of the first casing 1 along the axis or rotation X—X, and the upper casing 131 and the lower casing 132 of the camera casing 13 are joined together to rotatably support the camera unit 12.

In FIG. 6, one end of the flexible board 17 projecting from an ejection slot provided in the left end face of the camera casing 13 is connected to a circuit board, not shown, in the first casing 1. Dustproof rubber 31 is inserted into the ejection slot to prevent the intrusion of dust from the ejection slot for the flexible board 17 into the camera unit 12. Further, as shown in FIG. 2A, part of the cylinder of the camera casing 13 is chipped on the left side of the camera casing 13 to make it easy to remove the flexible board 17 from the camera casing 13. Further, a metallic circular ring 30 is fitted on the left side of the camera casing 13 to make the camera unit 12 rotate smoothly.

On the other hand, an end plate of a rotation angle limiter 29 is fitted into the right side of the camera casing 13 in FIG. 6. Then, a rotation control plate 38 is rotatably fitted on the tip of a shaft 37 fixed to the end plate of the rotation angle limiter 29 so that the rotation control limiter 29 mates with the first frame 32. The rotation angle limiter 29 limits the rotation angle to the half-turn range of 0 to 180 degrees on the basis of the prescribed direction. The center of rotation on the right side of the camera unit 12 is defined by a right-side joined portion 35 of the camera casing 13 and the first casing 1. Further, flexible boards 36 connected to electronic circuits respectively incorporated in the first and second casings lie across the inside of the hinge joint 3*b*.

Although the above embodiment takes a folding cellular phone with an imaging camera by way of example to describe the invention, the invention is not limited to such a cellular phone, and it is applicable to any other folding portable terminal such as a PDA and a notebook computer.

In other words, the invention is applicable not only to the cellular phone but also any folding portable terminal as long as it needs measures for durability against dropping impact or the like. It is needless to say that the present invention is also applicable to any casing having a module other than the camera casing having the imaging camera module as a casing provided between folding joints as long as it can lessen the impact from dropping or the like.

As described above, according to the invention, each side of the camera module is retained in place by the cushioning members in the imaging camera-equipped portable terminal, thereby preventing deformation-induced damage to the camera module when the portable terminal gets a strong shock due to dropping or the like. Further, according to the invention, the diameter of the rotation shaft of the imaging camera casing is set smaller than the outside diameter of the casing. In such a construction, there is no need to worry about a direct collision of the imaging camera casing with obstacles in case of dropping the portable terminal, thus preventing deformation-induced damage to the camera module.

It should be further understood by those skilled in the art that the foregoing description has been made on embodiments of the invention and that various changes and modifications may be made in the invention without departing from the spirit of the invention and the scope of the appended claims.

What is claimed is:

1. A folding portable terminal with an imaging camera, which includes a first outer housing having on one surface a first operation section for performing various operations, a second outer housing having on one surface a first display section for displaying information, and multiple joints for rotatably coupling the first outer housing and the second outer housing, with the first and second outer housings being able to be closed to each other to fold the portable terminal in such a manner to lap said surface of the first display section of the second outer housing over said surface of the first operation section of the first outer housing, said portable terminal comprising:

an outer camera casing having the imaging camera, said outer camera casing provided between said multiple joints independently of said first outer housing and said second outer casing so that a diameter of exposed portions of said outer camera housing is set smaller than the outer diameters of said multiple joints.

2. A folding portable terminal with an imaging camera according to claim 1, wherein at least two faces of an imaging camera module provided inside said outer camera casing come into contact with cushioning members.

3. A folding portable terminal with an imaging camera according to claim 2, wherein said cushioning members have a dustproof function for at least part of the imaging camera module.

4. A folding portable terminal with an imaging camera, the portable terminal comprising:

a first external housing having on one surface a first operation section for performing various operations, a second external housing having on one surface a first display section for displaying information, and multiple joints for rotatably coupling the first external housing and the second external housing, with the first and second external housings being able to be closed to each other to fold the portable terminal; and an external camera casing having the imaging camera therein, said external camera casing provided between said multiple joints independently of said first external housing and said second external housing, and having an outside diameter of the external camera casing set smaller than the outer diameters of said multiple joints.

5. A folding portable terminal with an imaging camera according to claim 4, wherein at least two faces of an imaging camera module provided inside said external camera casing come into contact with cushioning members.

6. A folding portable terminal with an imaging camera according to claim 5, wherein said cushioning members have a dustproof function for at least part of the imaging camera module.

7. A folding portable terminal with an imaging camera, the portable terminal comprising:
a first external housing having on one surface a first operation section for performing various operations and at least one first hinge portion, a second external housing having on one surface a first display section for displaying information and at least one second hinge portion, where a paired first hinge portion and second hinge portion form an external housing hinge portion and cooperate for rotatably coupling the first external housing and the second external housing, the external housing hinge portion having a predetermined outer diameter; and
an external camera casing having the imaging camera therein, said external camera casing provided independently of said first external housing and said second external housing, and having an outside diameter of the camera casing set smaller than the predetermined outer diameter of the external housing hinge portion.

8. A folding portable terminal with an imaging camera according to claim 7, wherein at least two faces of an imaging camera module provided inside said camera casing come into contact with cushioning members.

9. A folding portable terminal with an imaging camera according to claim 8, wherein said cushioning members have a dustproof function for at least part of the imaging camera module.

10. A folding portable terminal with an imaging camera according to claim 8, wherein the first external housing having at least two first hinge portions, and the second external housing having at least two second hinge portions, where two hinges including one of the first hinge portion and second hinge portion are formed to cooperate for rotatably coupling the first external housing and the second external housing, and wherein the external camera casing is disposed between the two hinges.

* * * * *